United States Patent
Shin et al.

(10) Patent No.: US 10,123,184 B2
(45) Date of Patent: Nov. 6, 2018

(54) METHOD FOR CONTROLLING CALL FORWARDING INFORMATION AND ELECTRONIC DEVICE THEREOF

(71) Applicant: Samsung Electronics Co., Ltd., Suwon-si, Gyeonggi-do (KR)

(72) Inventors: Yeung-Seob Shin, Yongin-si (KR); Hee-Deog Kim, Seongnam-si (KR); Sang-Min Bae, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 133 days.

(21) Appl. No.: 14/828,996

(22) Filed: Aug. 18, 2015

(65) Prior Publication Data
US 2016/0057593 A1 Feb. 25, 2016

(30) Foreign Application Priority Data
Aug. 19, 2014 (KR) .................. 10-2014-0107672

(51) Int. Cl.
| *H04M 3/42* | (2006.01) |
| *H04W 4/16* | (2009.01) |
| *H04M 3/58* | (2006.01) |
| *H04M 1/56* | (2006.01) |
| *H04M 1/57* | (2006.01) |
| *H04M 1/2745* | (2006.01) |
| *H04M 1/725* | (2006.01) |

(52) U.S. Cl.
CPC ............ *H04W 4/16* (2013.01); *H04M 1/56* (2013.01); *H04M 1/575* (2013.01); *H04M 3/58* (2013.01); *H04M 1/274508* (2013.01); *H04M 1/274533* (2013.01); *H04M 1/72583* (2013.01)

(58) Field of Classification Search
None
See application file for complete search history.

(56) References Cited

U.S. PATENT DOCUMENTS

| 7,050,558 B1* | 5/2006 | Pershan | H04M 3/42153 379/211.02 |
| 2004/0203351 A1* | 10/2004 | Shearer | H04M 1/6066 455/41.1 |
| 2005/0096009 A1* | 5/2005 | Ackley | H04M 1/663 455/405 |
| 2005/0157859 A1* | 7/2005 | Rodriguez | H04M 3/54 379/142.01 |
| 2005/0215243 A1* | 9/2005 | Black | H04M 1/006 455/417 |
| 2015/0260989 A1* | 9/2015 | Rahman | G02B 27/017 345/8 |

* cited by examiner

*Primary Examiner* — Shantell L Heiber
(74) *Attorney, Agent, or Firm* — Jefferson IP Law, LLP

(57) ABSTRACT

A method for controlling call forwarding information in an electronic device is provided. The method includes generating call forwarding information, detecting an outgoing event to a partner electronic device, and transmitting the call forwarding information to the partner electronic device.

16 Claims, 15 Drawing Sheets

METHOD FOR CONTROLLING CALL FORWARDING INFORMATION AND ELECTRONIC DEVICE THEREOF

CROSS-REFERENCE TO RELATED APPLICATION(S)

This application claims the benefit under 35 U.S.C. § 119(a) of a Korean patent application filed on Aug. 19, 2014 in the Korean Intellectual Property Office and assigned Serial number 10-2014-0107672, the entire disclosure of which is hereby incorporated by reference.

TECHNICAL FIELD

The present disclosure relates to a method for controlling call forwarding information in an electronic device, and an electronic device thereof.

BACKGROUND

Recently, the number of electronic devices that perform one or more functions has been gradually increasing. In addition, the electronic devices usually feature mobile terminals which are roughly classified into so-called "smart phones". Such an electronic device may include a large screen touch type display module and also include a high-pixel camera module other than the basic function such as communication with the other party, and therefore it can photograph still images or moving images, and perform a web surfing by connecting to a network. These electronic devices increasingly have high-performance processors and thereby perform various functions.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method for controlling call forwarding information in an electronic device, and an electronic device thereof.

In accordance with an aspect of the present disclosure, a method for controlling call forwarding information in an electronic device is provided. The method includes generating call forwarding information, detecting an outgoing event to a partner electronic device, and transmitting the call forwarding information to the partner electronic device.

In accordance with another aspect of the present disclosure, an electronic device is provided. The electronic device includes a processor that controls to generate call forwarding information, detect an outgoing event to a partner electronic device, and to transmit the call forwarding information to the partner electronic device.

In accordance with another aspect of the present disclosure, a non-transitory computer-readable recording medium for storing a program including instructions for execution by one or more processors is provided. The program includes first instructions for an operation of generating call forwarding information, second instructions for an operation of detecting an outgoing event to a partner electronic device, and third instructions for an operation of transmitting the call forwarding information to the partner electronic device is recorded.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
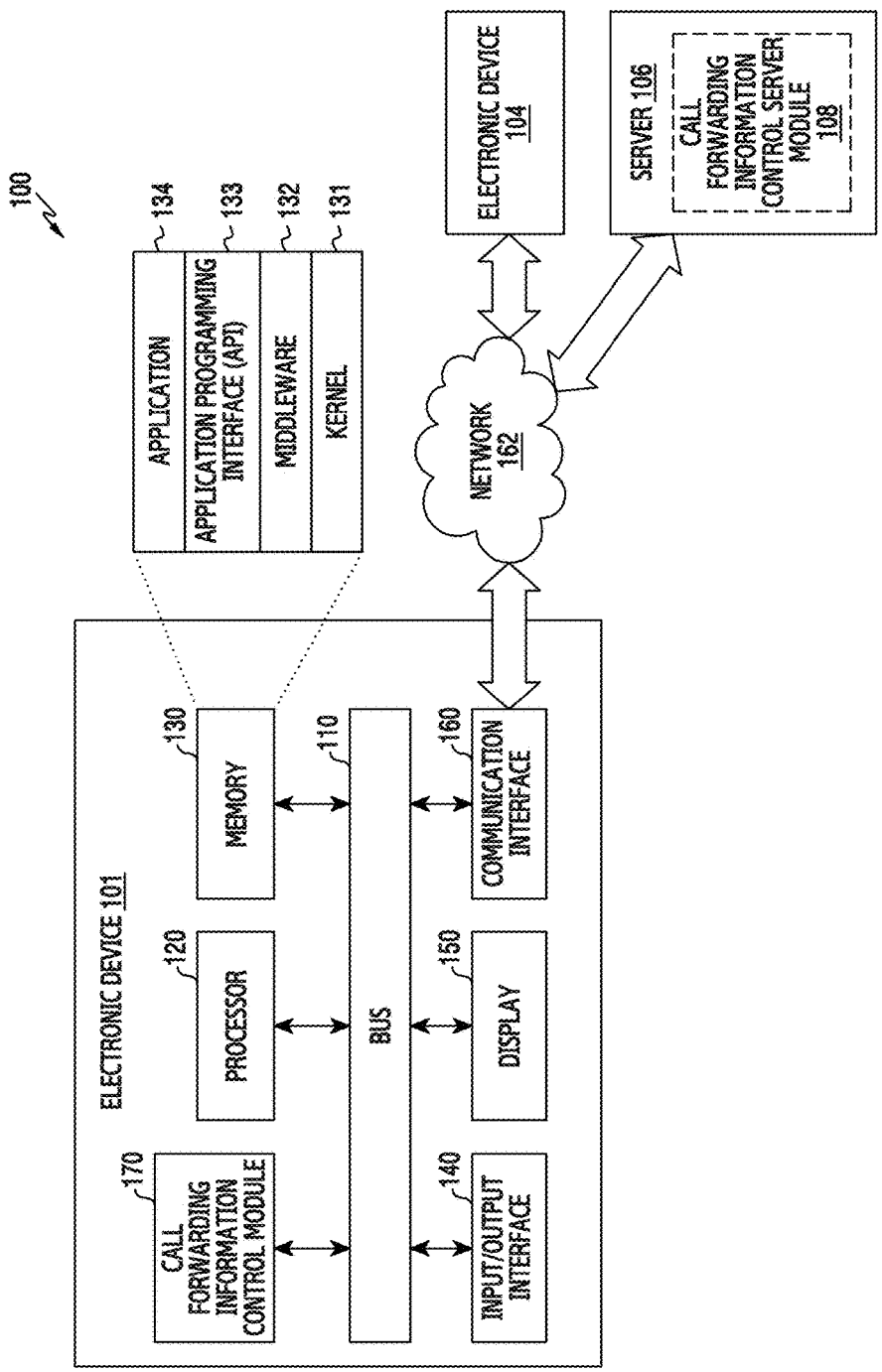
FIG. 1 illustrates a network environment including an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include" or "may include" refers to the existence of a corresponding disclosed function, operation or component which can be used in various embodiments of the present disclosure and does not limit one or more additional functions, operations, or components. Further, as used in various embodiments of the present disclosure, the terms "include", "have" and their conjugates may be construed to denote a certain characteristic, number, operation, constituent element, component or a combination thereof, but may not be construed to exclude the existence of or a possibility of addition of one or more other characteristics, numbers, operations, constituent elements, components or combinations thereof.

In various embodiments of the present disclosure, the expression "or" or "at least one of A or/and B" includes any or all of combinations of words listed together. For example, the expression "A or B" or "at least A or/and B" may include A, may include B, or may include both A and B.

The expression "1", "2", "first", or "second" used in various embodiments of the present disclosure may modify various components of various embodiments but does not limit the corresponding components. For example, the above expressions do not limit the sequence and/or importance of the corresponding elements. The above expressions are used merely for the purpose of distinguishing an element from the other elements. For example, a first user device and a second user device indicate different user devices although both of them are user devices. For example, a first element could be termed a second element, and similarly, a second element could be also termed a first element without departing from the scope of the present disclosure.

It should be noted that if it is described that one component element is "coupled" or "connected" to another component element, the first component element may be directly coupled or connected to the second component, and a third component element may be "coupled" or "connected" between the first and second component elements. Conversely, when one component element is "directly coupled" or "directly connected" to another component element, it may be construed that a third component element does not exist between the first component element and the second component element.

As used herein, terms are used merely for describing specific embodiments and are not intended to limit the present disclosure.

Unless defined otherwise, all terms used herein, including technical and scientific terms, have the same meaning as commonly understood by those of skill in the art to which the present disclosure pertains. Such terms as those defined in a generally used dictionary are to be interpreted to have the meanings equal to the contextual meanings in the relevant field of art, and are not to be interpreted to have ideal or excessively formal meanings unless clearly defined in the present disclosure.

For example, the electronic device may include at least one of a smartphone, a tablet personal computer (PC), a mobile phone, a video phone, an electronic book (e-book) reader, a desktop PC, a laptop PC, a netbook computer, a personal digital assistant (PDA), a portable multimedia player (PMP), a digital audio player, a mobile medical appliance, a camera, or a wearable device (e.g., a head-mounted-device (HMD) such as electronic glasses, electronic clothes, an electronic bracelet, an electronic necklace, an electronic accessory, electronic tattoos, or a smart watch).

According to various embodiments of the present disclosure, the electronic device may be a smart home appliance. The smart home appliance as an example of the electronic device may include at least one of a television (TV), a digital versatile disc (DVD) player, an audio, a refrigerator, an air conditioner, a vacuum cleaner, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, or an electronic picture frame.

According to various embodiments of the present disclosure, the electronic device may include at least one of various medical appliances (e.g. magnetic resonance angiography (MRA), magnetic resonance imaging (MRI), computed tomography (CT) machine, and an ultrasonic machine), navigation devices, global positioning system (GPS) receivers, event data recorders (EDRs), flight data recorders (FDRs), automotive infortainment devices, electronic equipments for ships (e.g. navigation equipments for ships, gyrocompasses, or the like), avionics, security devices, head units for vehicles, industrial or home robots, automatic teller machines (ATM) of banking facilities, or point of sales (POSs) of shops.

According to various embodiments of the present disclosure, the electronic device may include at least one of a part of furniture or a building/structure, an electronic board, an electronic signature receiving device, a projector, or various kinds of measuring instruments (e.g., a water meter, an electric meter, a gas meter, and a radio wave meter). In various embodiments of the present disclosure, the electronic device may be a combination of one or more of the aforementioned various devices. Also, the electronic device according to the present disclosure may be a flexible device. Further, it is obvious to those skilled in the art that the electronic device according to the present disclosure is not limited to the aforementioned devices.

Hereinafter, an electronic device according to various embodiments of the present disclosure will be described with reference to the accompanying drawings. The term "user" used in various embodiments of the present disclosure may refer to a person who uses an electronic device or a device (for example, an artificial intelligence electronic device) that uses an electronic device.

According to various embodiments of the present disclosure, there are provided a method and a device which may provide call forwarding information to a partner electronic device, and update identification information of the partner electronic device based on call forwarding information received from the partner electronic device.

According to various embodiments of the present disclosure, there are provided a method and a device which may provide an outgoing event to a partner electronic device based on call forwarding information received from the partner electronic device.

FIG. 1 illustrates a network environment 100 including an electronic device 101 according to various embodiments of the present disclosure.

Referring to FIG. 1, the electronic device 101 may include a bus 110, a processor 120, a memory 130, an input/output interface 140, a display 150, a communication interface 160, and a call forwarding information control module 170.

The bus 110 may be a circuit that interconnects the aforementioned components and transmits a communication (e.g., a control message) between the aforementioned components.

The processor 120 may receive instructions from, for example, the aforementioned other components (e.g., the memory 130, the input/output interface 140, the display 150, the communication interface 160, the call forwarding information control module 170, etc.) via the bus 110, decipher the received instructions, and execute operations or data processing according to the deciphered instructions.

The memory 130 may store commands or data received from the processor 120 or the other components (e.g., the input/output interface 140, the display 150, the communication interface 160, the call forwarding information control module 170, etc.) or generated by the processor 120 or the other components. The memory 130 may include programming modules, such as a kernel 131, a middleware 132, an application programming interface (API) 133, an application 134, and the like. Each of the aforementioned programming modules may be implemented in software, firmware, hardware, or a combination of at least two or more of them.

The kernel 131 may control or manage system resources (e.g., the bus 110, the processor 120, the memory 130, etc.) used to execute operations or functions implemented by the remnant other programming modules, for example, the middleware 132, the API 133, and the application 134. In addition, the kernel 131 may provide an interface capable of accessing and controlling or managing the individual components of the electronic device 101 using the middleware 132, the API 133, or the application 134.

The middleware 132 may serve as an intermediary between the API 133 or the application 134 and the kernel 131 in such a manner that the API 133 or the application 134 can communicate with the kernel 131 and exchange data therewith. In addition, in relation to work requests received from the application 134, the middleware 132, for example, may perform control (e.g., scheduling or load balancing) of the work requests using a method of assigning a priority, in which system resources (e.g., the bus 110, the processor 120, the memory 130, etc.) of the electronic device 101 may be used, to at least one of the applications 134.

The API 133 is an interface through which the application 134 can control a function provided by the kernel 131 or the middleware 132, and may include, for example, at least one interface or function (e.g., a command) for file control, window control, image processing, character control, or the like.

According to various embodiments of the present disclosure, the application 134 can include a short message service (SMS)/multimedia message service (MMS) application, an electronic mail (e-mail) application, a calendar application, an alarm application, a health care application (e.g., an application measuring momentum, blood sugar, or the like), an environment information application (e.g., an application providing atmospheric pressure, humidity, temperature information, or the like), or the like. Additionally or alternatively, the application 134 can be an application related to information exchange between the electronic device 101 and an external electronic device (e.g., an electronic device 104). The application related to the information exchange can include, for example, a notification forward application for forwarding specific information to the external electronic device, or a device management application for managing the external electronic device.

For example, the notification forward application may include a function of forwarding, to the external electronic device (e.g., the electronic device 104), notification information generated from the other applications (e.g., the SMS/MMS application, the e-mail application, the health care application, the environment information application, etc.) of the electronic device 101. Additionally or alternatively, the notification forward application can receive the notification information from the external electronic device (e.g., the electronic device 104) and provide the received notification information to a user. The device management application can manage (e.g., install, delete or update) a function (e.g., turn-on/turn-off of the external electronic device itself (or some constituent parts thereof) or adjustment of display brightness (or resolution)) of at least a part of the external electronic device (e.g., the electronic device 104) communicating with, for example, the electronic device 101, an application operating in the external electronic device, or a service (e.g., a call service or a message service) provided in the external electronic device.

According to various embodiments of the present disclosure, the application 134 may include an application designated according to an attribute (e.g., a kind of the electronic device) of the external electronic device (e.g., the electronic device 104). For example, when the external electronic device is a digital audio player, the application 134 may include an application related to music playing. Similarly, when the external electronic device is a mobile medical instrument, the application 134 may include an application related to health care. According to an embodiment of the present disclosure, the application 134 may include at least one of an application designated to the electronic device 101 or an application received from the external electronic device (e.g., the server 106 or the electronic device 104).

The input/output interface 140 may forward an instruction or data, which is inputted from a user through an input/output device (e.g., a sensor, a keyboard or a touch screen), to the processor 120, the memory 130, the communication interface 160, or the call forwarding information control module 170 through, for example, the bus 110. For example, the input/output interface 140 may provide the processor 120 with data about a user's touch inputted through the touch screen. Also, the input/output interface 140 may output, through an input/output device (e.g., a speaker or a display), the instruction or data received from the processor 120, the memory 130, the communication interface 160, or the call forwarding information control module 170 through, for example, the bus 110. For example, the input/output interface 140 may output voice data, which is processed through the processor 120, to a user through the speaker.

The display 150 may display a variety of information (e.g., multimedia data, text data, or the like) to a user.

The communication interface 160 may connect communication between the electronic device 101 and the external device (e.g., the electronic device 104 or the server 106). For example, the communication interface 160 may be connected to a network 162 through wireless communication or wired communication to thereby communicate with an external device. The wireless communication may include at least one of, for example, Wi-Fi, Bluetooth (BT), near field communication (NFC), GPS, and cellular communication (e.g., long term evolution (LTE), LTE-advanced (LTE-A), code division multiple access (CDMA), wideband CDMA (WCDMA), universal mobile telecommunications system (UMTS), wireless broadband (WiBro), global system for mobile communications (GSM), or the like). The wired communication may include at least one of, for example, universe serial bus (USB), a high definition multimedia interface (HDMI), a recommended standard-232 (RS-232), or plain old telephone service (POTS).

According to an embodiment of the present disclosure, the network 162 may be a telecommunication network. The telecommunication network may include at least one of a computer network, the Internet, the Internet of things, or a telephone network. According to an embodiment of the present disclosure, a protocol (e.g., transport layer protocol, data link layer protocol, or physical layer protocol) for communication between the electronic device 101 and the external device may be supported in at least one of the application 134, the API 133, the middleware 132, the kernel 131, or the communication interface 160.

According to an embodiment of the present disclosure, the server 106 may support driving of the electronic device 101 by performing at least one of operations (or functions) implemented in the electronic device 101. For example, the server 106 may include a call forwarding information control server module 108 that can support the call forwarding information control module 170 implemented in the electronic device 101. For example, the call forwarding information control server module 108 may include at least one component of the call forwarding information control module 170, and perform (e.g., substitutingly perform) at least one of the operations performed by the call forwarding information control module 170.

The call forwarding information control module 170 will be described in detail with reference to FIG. 2 which will be described below.

Figure 2:
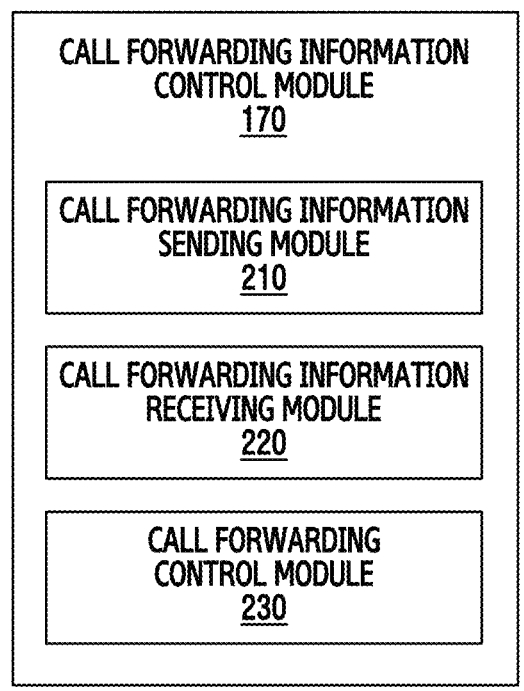
FIG. 2 is a block diagram illustrating a call forwarding information control module of an electronic device according to various embodiments of the present disclosure.

FIG. 2 is a block diagram illustrating a call forwarding information control module 170 of an electronic device (e.g., the electronic device 101) according to various embodiments of the present disclosure.

Referring to FIG. 2, the call forwarding information control module 170 may include a call forwarding information sending module 210, a call forwarding information receiving module 220, and a call forwarding control module 230.

Figure 3:
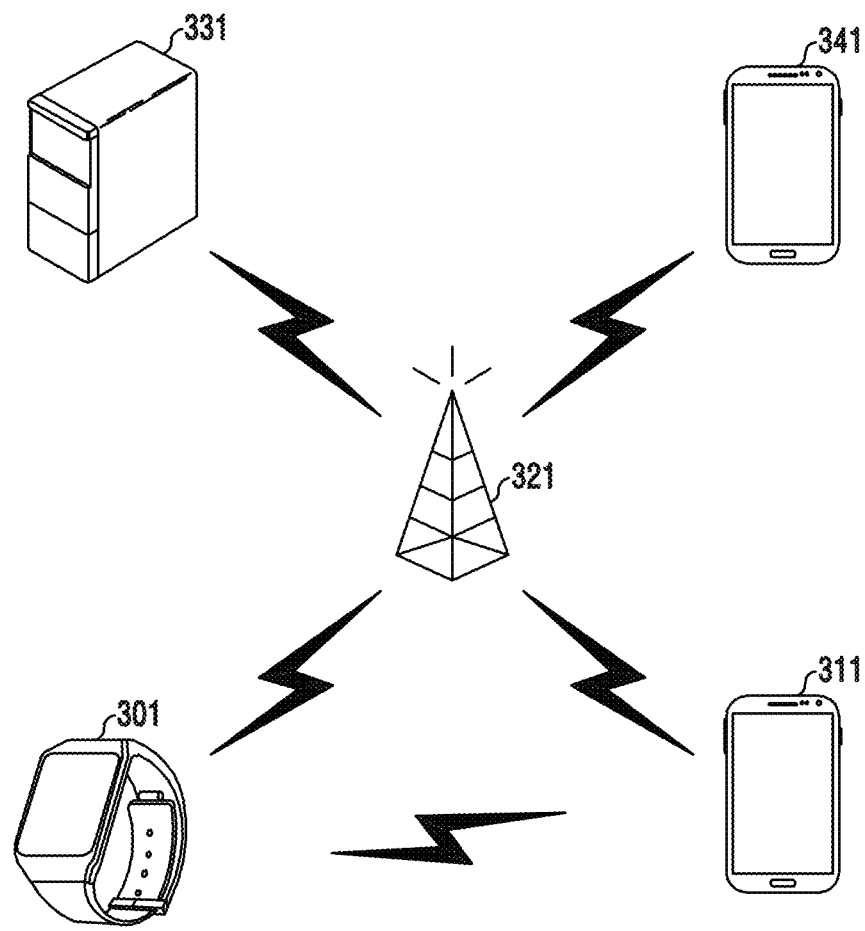
FIG. 3 is a diagram illustrating an example of transmitting call forwarding information to a partner electronic device according to various embodiments of the present disclosure.

FIG. 3 is a diagram illustrating an example of transmitting call forwarding information to a partner electronic device according to various embodiments of the present disclosure.

Referring to FIG. 3, the call forwarding information control module 170 shown in FIG. 2 may be implemented in an electronic device such as a wearable device indicated by reference numeral 301 or an electronic device such as smart phones indicated by reference numerals 311 and 341. The wearable device 301 and the electronic device 311 are devices owned by the same user, and can be interpreted as a device in which display and communication functions are included, such as the electronic device 101 of FIG. 1. In FIG. 3, the wearable device 301 is shown as a watch type wearable device, but may be a pad larger than a smart phone.

Hereinafter, in order to classify and display two devices owned by the same user, a wearable device will be described as a first electronic device 301 and an electronic device such as a smart phone will be described as a second electronic device 311. In addition, an electronic device 341 is a device owned by another user other than the user, and for ease of description, will be described as a "partner electronic device". However, the contents of the disclosure are not limited by this description. Further, the first electronic device 301, the second electronic device 311, the electronic device 341, and a server 331 may communicate via network 321.

When the first electronic device 301 makes a call (e.g., SMS/MMS/telephone) to the partner electronic device 341, identification information (e.g., a phone number) of the first electronic device 301 is transmitted to the partner electronic device 341 as a reply number. However, only when using the first electronic device 301, a user may turn on the power of the first electronic device 301, and otherwise, the user may turn off the power of the first electronic device 301 and mainly use the second electronic device 311. When the partner electronic device 341 makes a call to the reply number, the call is made to the first electronic device 301, and when the power of the first electronic device 301 is turned off, a user may not receive the call from the partner electronic device 341 although the user uses the second electronic device 311.

Thus, according to the present disclosure, even when a call is made to the partner electronic device 341 using the first electronic device 301, even identification information of the second electronic device 311 as well as the identification information of the first electronic device 301 may be transmitted to the partner electronic device 341, and therefore the partner electronic device 341 may selectively make a call to the first electronic device 301 or the second electronic device 311.

In FIG. 2, a case in which a call is made to the partner electronic device 341 from the first electronic device 301 will be described.

Referring to FIGS. 2 and 3, the call forwarding information sending module 210 may control to generate call forwarding information. According to various embodiments of the present disclosure, the call forwarding information sending module 210 may generate the call forwarding information including identification information (e.g., a phone number, an e-mail, etc. of the first electronic device 301) of the first electronic device 301 and name information (e.g., business card information) of the second electronic device 311. For example, the name information (e.g., business card information) may be referred to as "vCard", and include a name, an address, a phone number, an e-mail, a website, a logo, a picture, sound, texts, an image, a video, or multimedia which are associated with a user of the second electronic device 311.

According to various embodiments of the present disclosure, the call forwarding information sending module 210 may provide a user interface for acquiring the call forwarding information from a user.

In addition, the call forwarding information sending module 210 may control to transmit the call forwarding information to the partner electronic device. According to an embodiment of the present disclosure, as illustrated in FIG. 3, the call forwarding information sending module 210 may transmit the call forwarding information of the first electronic device 301 to the partner electronic device 341 during an outgoing event to the partner electronic device 341 or after the outgoing event.

According to various embodiments of the present disclosure, the call forwarding information sending module 210 may transmit the call forwarding information of the first electronic device 301 to the partner electronic device 341 through the second electronic device 311 connected to the first electronic device 301 during the outgoing event to the partner electronic device 341 or after the outgoing event.

According to various embodiments of the present disclosure, the call forwarding information sending module 210 may control to transmit the call forwarding information of the first electronic device 301 to the partner electronic device 341 through a server 331.

According to various embodiments of the present disclosure, the call forwarding information sending module 210 may determine a subject to transmit the call forwarding information of the first electronic device 301 to the partner electronic device 341, as at least one of the first electronic device 301, the second electronic device 311, or the server 331.

The call forwarding information receiving module 220 may receive call forwarding information about the partner electronic device 341 from the partner electronic device 341. According to an embodiment of the present disclosure, the call forwarding information receiving module 220 may receive the call forwarding information from the partner electronic device 341 during a call with the partner electronic device 341 or after the end of the call with the partner electronic device 341.

In addition, the call forwarding control module 230 may change identification information of the partner electronic device 341 based on the call forwarding information received from the partner electronic device 341.

Figure 7A:
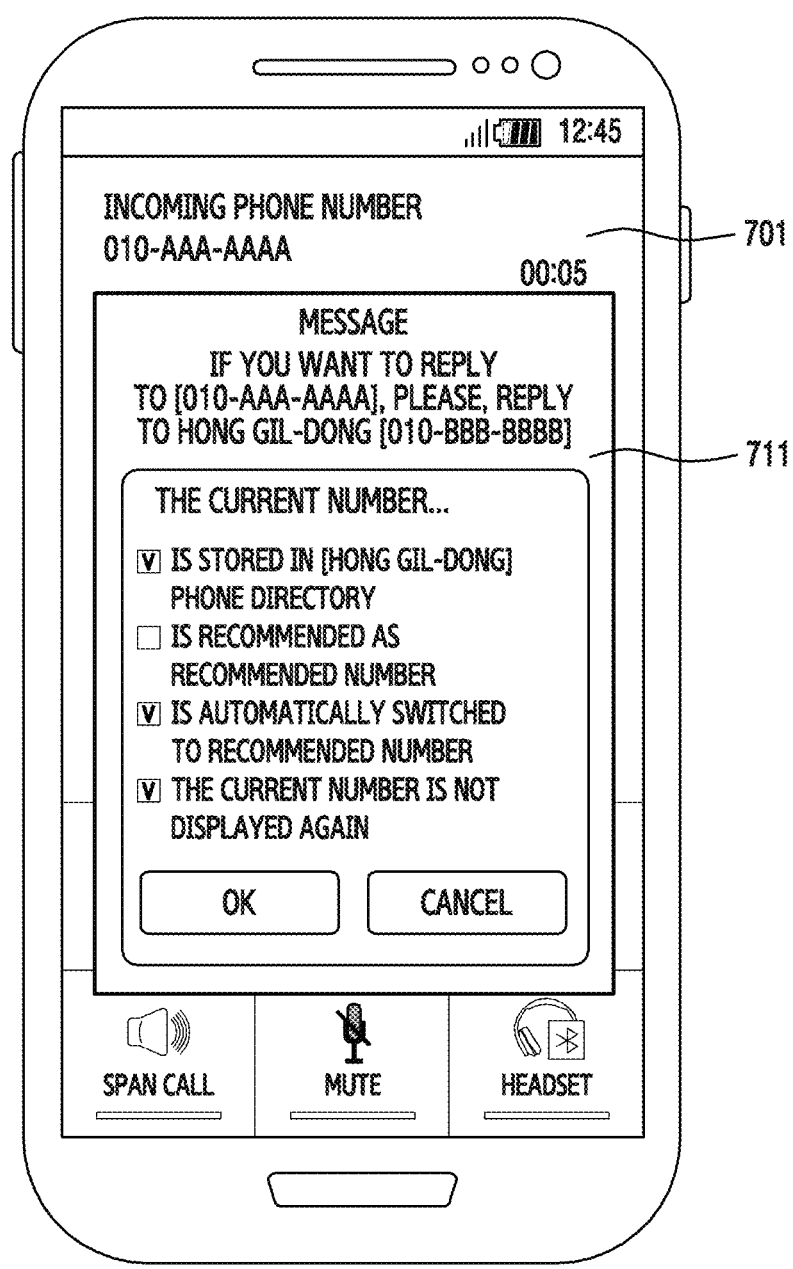
FIGS. 7A and 7B illustrate an example of displaying call forwarding information received from a partner electronic device according to various embodiments of the present disclosure.
Figure 7B:
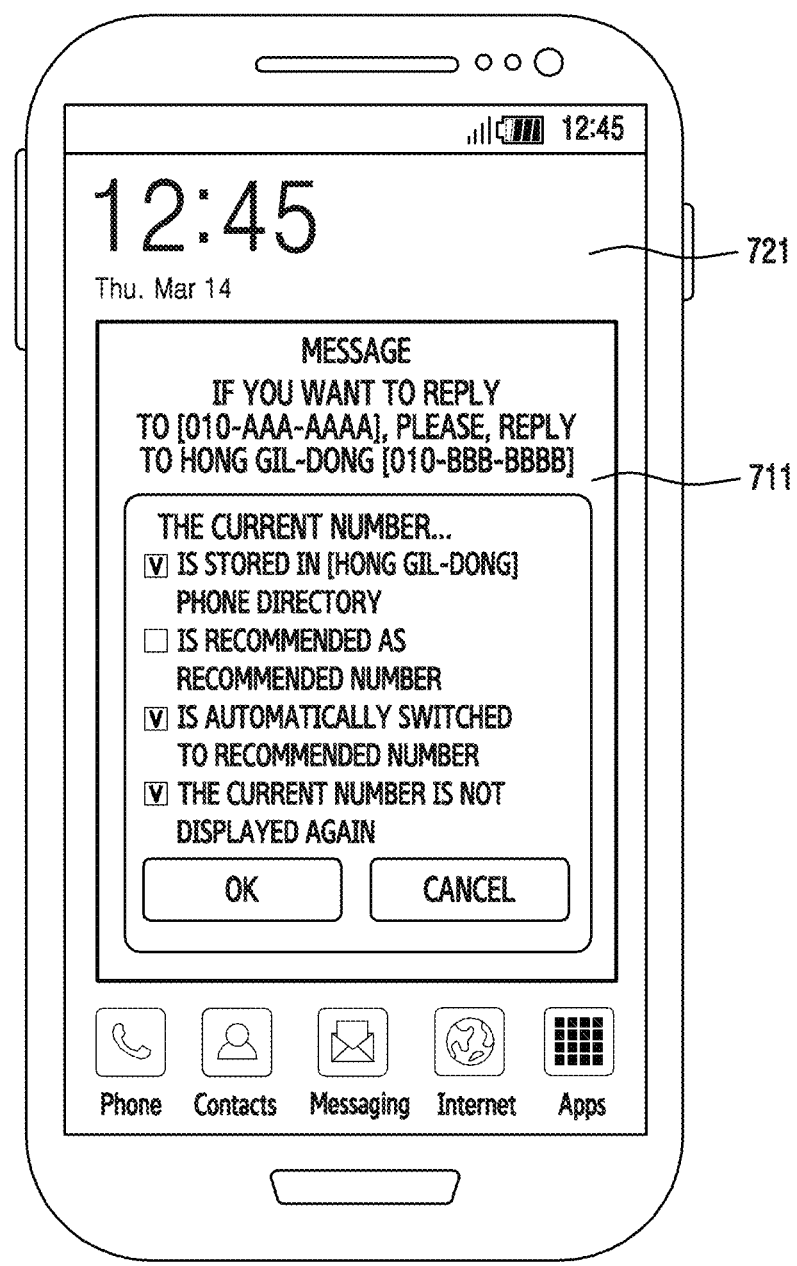

FIGS. 7A and 7B illustrate an example of displaying call forwarding information received from a partner electronic device according to various embodiments of the present disclosure.

Referring to FIG. 7A, the call forwarding control module 230 may display call forwarding information of a section 711 received from the partner electronic device 341 during a call with the partner electronic device 341 as shown in a section 701. For example, a reception number 010-AAA-AAAA may be a first contact number (e.g., a phone number of the partner electronic device 341) of the partner electronic device 341, and 010-BBB-BBBB may be a second contact number (e.g., a phone number of an electronic device associated with the partner electronic device 341) of the partner electronic device 341. The call forwarding control module 230 may or may not register the second contact number 010-BBB-BBBB as the identification information of the partner electronic device 341 based on a user's selection.

According to various embodiments of the present disclosure, the call forwarding control module 230 may or may not register the second contact number 010-BBB-BBBB as the identification information of the partner electronic device 341 based on a predetermined condition when the call forwarding information of the section 711 of the partner electronic device is displayed and then the user's selection does not occur for a reference time. For example, when the user's selection does not occur for the reference time, the call forwarding control module 230 may register the first contact number 010-AAA-AAAA as the identification information of the partner electronic device 341. Alternatively, when the user's selection does not occur for the reference time, the call forwarding control module 230 may register the second contact number 010-BBB-BBBB of the partner electronic device 341 as the identification information of the partner electronic device 341.

According to an embodiment of the present disclosure, as illustrated in FIG. 7B, the call forwarding control module 230 may display the call forwarding information of the section 711 received from the partner electronic device 341 after the end of the call with the partner electronic device 341 as shown in a section 721. The call forwarding information of the section 711 may include the first contact number 010-AAA-AAAA and the second contact number 010-BBB-BBBB of the partner electronic device 341. The call forwarding control module 230 may store the second contact number 010-BBB-BBBB received from the partner electronic device 341, as identification information (e.g., contact number entries) of "Hong Gil-Dong" stored as the partner electronic device 341 in a phone directory.

Figure 8:
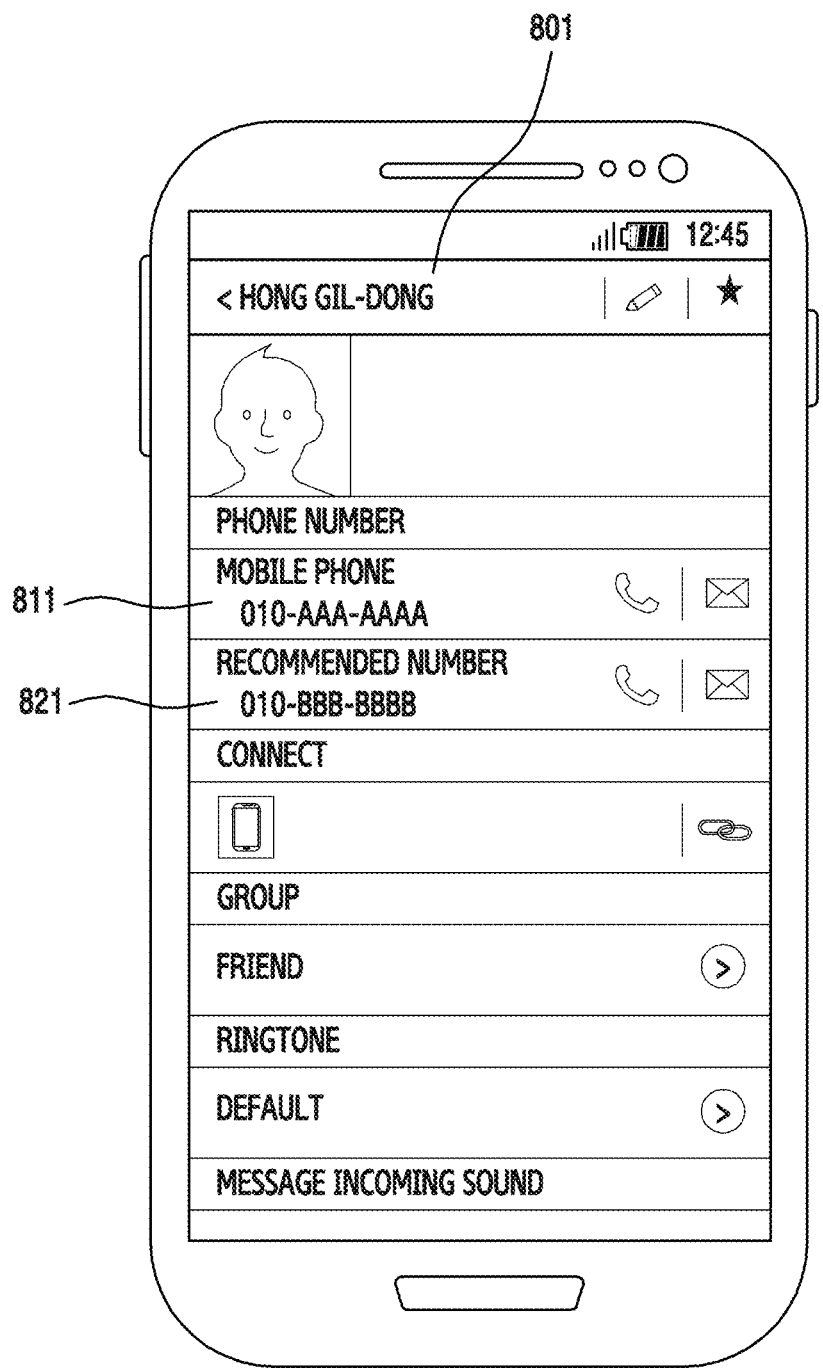
FIG. 8 illustrates an example of storing identification information of a partner electronic device based on call forwarding information received from the partner electronic device according to various embodiments of the present disclosure.

FIG. 8 illustrates an example of storing identification information of a partner electronic device based on call forwarding information received from the partner electronic device according to various embodiments of the present disclosure.

Referring to FIG. 8, the call forwarding control module 230 may store a first contact number 010-AAA-AAAA of a section 811 of the partner electronic device 341 and a second contact number 010-BBB-BBBB of a section 821 of the partner electronic device 341, as contact number information of a section 801 of a user (e.g., Hong Gil-Dong) of the partner electronic device 341 stored in the phone directory. For example, the call forwarding control module 230 may store the first contact number 010-AAA-AAAA of the section 811 as a reply number of the partner electronic device 341, and store the second contact number 010-BBB-BBBB of the section 821 as a recommended number of the partner electronic device 341. Alternatively, the call forwarding control module 230 may store the second contact number 010-BBB-BBBB of the section 821 as the reply number of the partner electronic device 341, and store the first contact number 010-AAA-AAAA of the section 811 as the recommended number of the partner electronic device 341.

According to an embodiment of the present disclosure, when an outgoing event such as a message transmission or a call to the partner electronic device 341 is requested from a user, the call forwarding control module 230 may set to provide an interface through which an incoming phone number can be switched to the recommended number (e.g., 010-BBB-BBBB) of the partner electronic device 341.

According to an embodiment of the present disclosure, when an outgoing event such as a message transmission or a call to the partner electronic device 341 is requested from a user, the call forwarding control module 230 may set an incoming phone number to be automatically switched to a mobile phone 010-AAA-AAAA of the partner electronic device 341.

According to an embodiment of the present disclosure, the call forwarding control module 230 may set a registration event for the call forwarding information of the section 711 received from the partner electronic device 341 not to be displayed again.

The call forwarding control module 230 may originate a call based on the call forwarding information about the partner electronic device when originating a call to the partner electronic device.

Figure 10A:
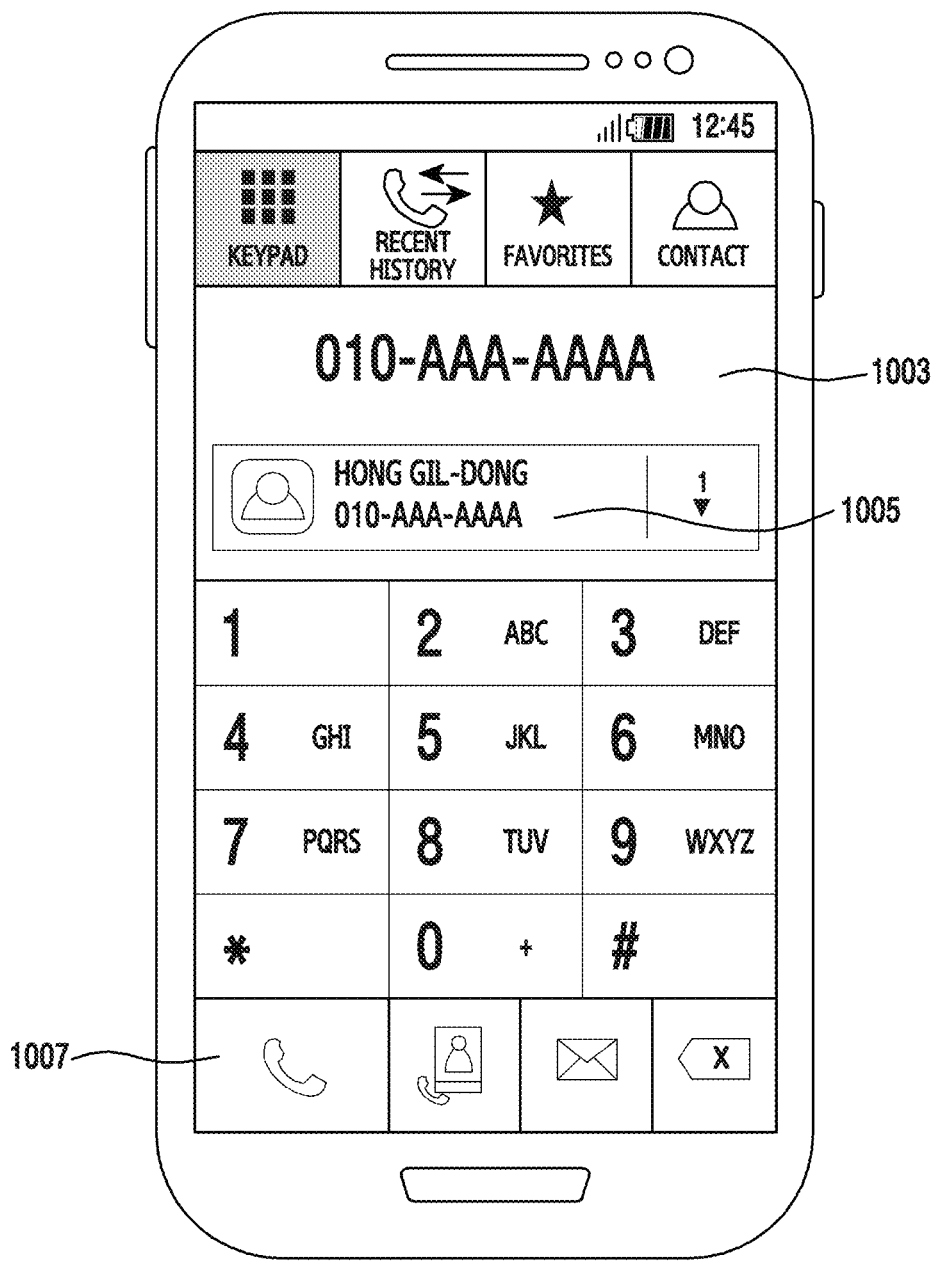
FIGS. 10A and 10B illustrates an example of guiding call forwarding information of a partner electronic device when an outgoing event occurs according to various embodiments of the present disclosure.
Figure 10B:
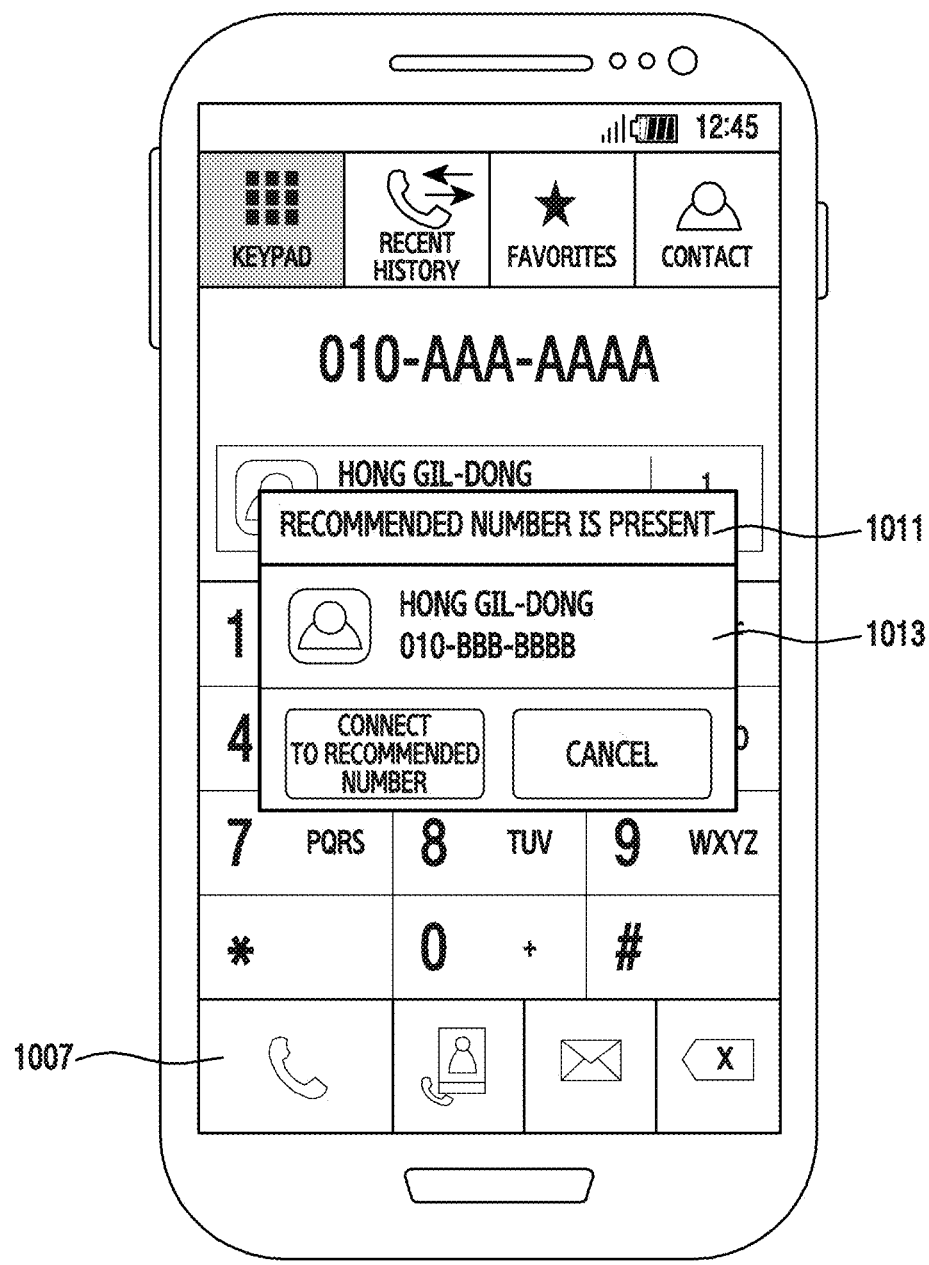

FIGS. 10A and 10B illustrate an example of guiding call forwarding information of a partner electronic device when an outgoing event occurs according to various embodiments of the present disclosure.

Referring to FIG. 10B, when receiving an input of the first contact number (e.g., 010-AAA-AAAA) through a keypad, the call forwarding control module 230 may determine whether call forwarding information about the first contact number 010-AAA-AAAA is present. When the call forwarding information about the first contact number 010-AAA-AAAA is present, the call forwarding control module 230 may provide the second contact number 010-BBB-BBBB of a section 1013 based on the call forwarding information as shown in a section 1011.

Figure 12:
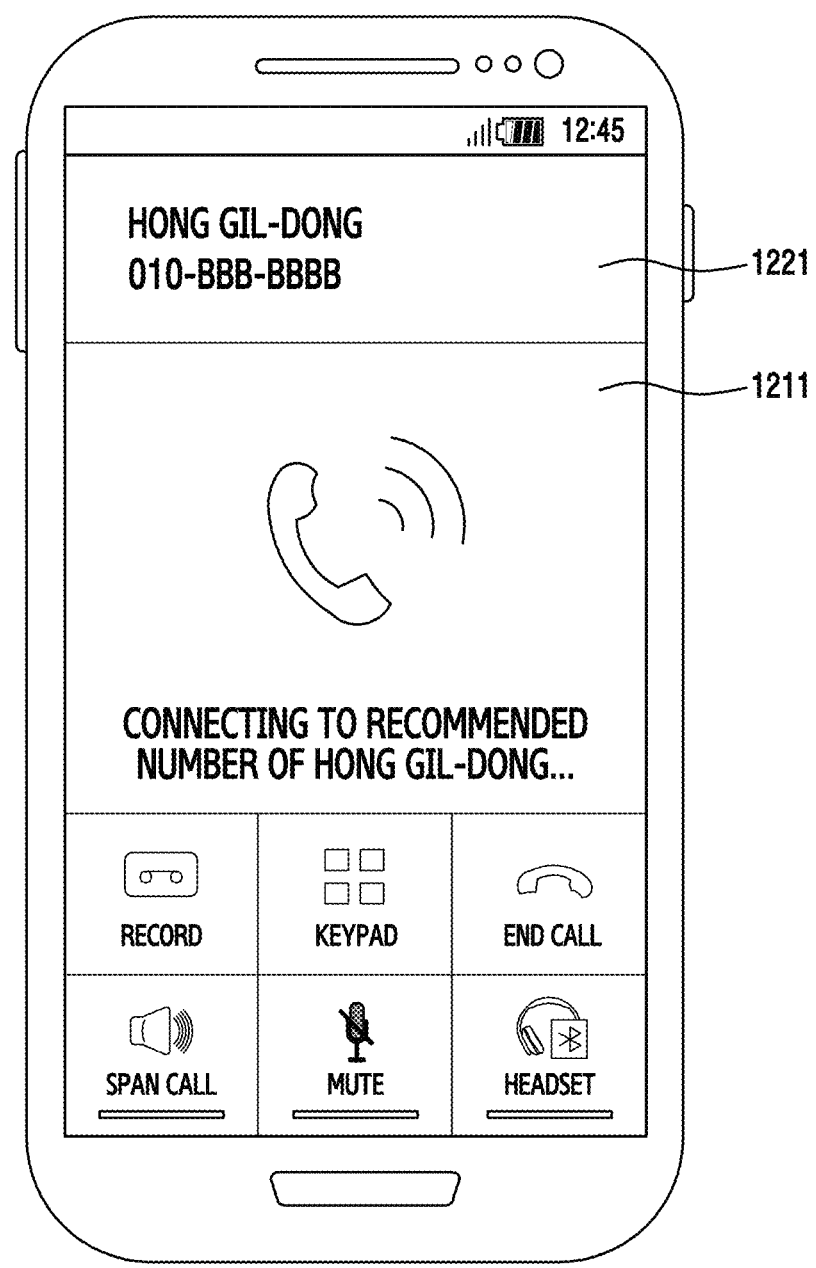
FIG. 12 illustrates an example of originating a call based on call forwarding information according to various embodiments of the present disclosure.

FIG. 12 illustrates an example of originating a call based on call forwarding information according to various embodiments of the present disclosure.

Referring to FIG. 12, when a user selects the call forwarding information in FIG. 10B, the call forwarding control module 230 may attempt a call connection 1211 to the second contact number 010-BBB-BBBB 1221 based on the call forwarding information.

According to various embodiments of the present disclosure, the electronic device may be an electronic device including a processor that controls to generate call forwarding information, detect an outgoing event to a partner electronic device, and transmit the call forwarding information to the partner electronic device.

According to various embodiments of the present disclosure, the call forwarding information may include identification information associated with the electronic device and name information (e.g., business card information) associated with a user of the electronic device.

According to various embodiments of the present disclosure, the identification information may include at least one of a phone number, an e-mail, an image, a video, or texts of the electronic device, and the name information may include at least one of a name, an address, a phone number, an e-mail, a website, a picture, a logo, sound, texts, an image, a video, or multimedia associated with a user of the electronic device.

According to various embodiments of the present disclosure, the processor may control to transmit the call forwarding information during a call with the partner electronic device or after the end of the call.

According to various embodiments of the present disclosure, the processor may control to receive the call forwarding information from the partner electronic device, and to update identification information of the partner electronic device based on the received call forwarding information.

According to various embodiments of the present disclosure, the processor may control to receive the call forwarding information during a call with the partner electronic device or after the end of the call.

According to various embodiments of the present disclosure, the processor may control to display the received call forwarding information.

According to various embodiments of the present disclosure, the electronic device may include a processor that detects an outgoing event to a partner electronic device, detects whether call forwarding information corresponding to identification information of the partner electronic device is present, and performs the outgoing event to the partner electronic device based on the call forwarding information corresponding to the identification information of the partner electronic device.

According to various embodiments of the present disclosure, when the call forwarding information corresponding to the identification information of the partner electronic device is present, the processor may control to display the call forwarding information corresponding to the identification information of the partner electronic device. According to various embodiments of the present disclosure, after displaying the call forwarding information corresponding to the identification information of the partner electronic device, the processor may control to determine whether to originate a call based on the call forwarding information.

Figure 4:
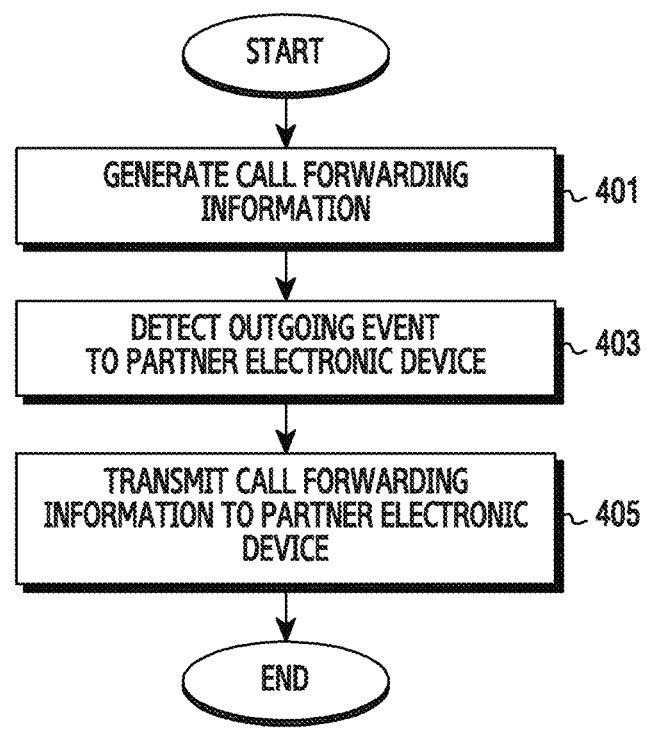
FIG. 4 is a flowchart illustrating a process of generating call forwarding information and transmitting the generated call forwarding information to a partner electronic device according to various embodiments of the present disclosure.

FIG. 4 is a flowchart illustrating a process of generating call forwarding information and transmitting the generated call forwarding information to a partner electronic device according to various embodiments of the present disclosure.

Referring to FIG. 4, in operation 401, an electronic device may generate call forwarding information. According to an embodiment of the present disclosure, the call forwarding information may include identification information of the electronic device and name information (e.g., business card information) associated with the electronic device. For example, the identification information of the electronic device may be a phone number, an e-mail, or the like of the first electronic device 301. The name information (e.g., business card information) associated with the electronic device may include at least one of a name, an address, a phone number, an e-mail, a website, a logo, a picture, sound, texts, an image, a video, or multimedia associated with a user of the second electronic device 311. According to an embodiment of the present disclosure, the electronic device may provide a user interface for acquiring the call forwarding information from a user.

In operation 403, the electronic device may determine whether an outgoing event to the partner electronic device occurs. According to an embodiment of the present disclosure, the outgoing event may include at least one of an SMS, an MMS, or a call. According to an embodiment of the present disclosure, as illustrated in FIG. 3, the first electronic device 301 may determine whether an outgoing event to the partner electronic device 341 occurs. In this case, the first electronic device 301 may determine whether the outgoing event to the partner electronic device 341 occurs through the second electronic device 311 connected to the first electronic device 301.

In operation 405, the electronic device may transmit the call forwarding information to the partner electronic device. Referring to FIG. 3, the first electronic device 301 may transmit call forwarding information of the first electronic device 301 to the partner electronic device 341 during the outgoing event to the partner electronic device 341 or after the end of the outgoing event. Alternatively, the first electronic device 301 may transmit the call forwarding information of the first electronic device 301 to the partner electronic device 341 during the outgoing event to the partner electronic device 341 or after the end of the outgoing event, through the second electronic device 311 connected to the first electronic device 301.

According to an embodiment of the present disclosure, the first electronic device 301 may control the second electronic device 311 to transmit the call forwarding information of the first electronic device 301 to the partner electronic device 341.

According to an embodiment of the present disclosure, the first electronic device 301 may control the server 331 to transmit the call forwarding information of the first electronic device 301 to the partner electronic device 341.

According to an embodiment of the present disclosure, the first electronic device 301 may determine a medium to transmit the call forwarding information of the first electronic device 301 to the partner electronic device 341, as at least one of the first electronic device 301, the second electronic device 311, or the server 331.

Figure 5:
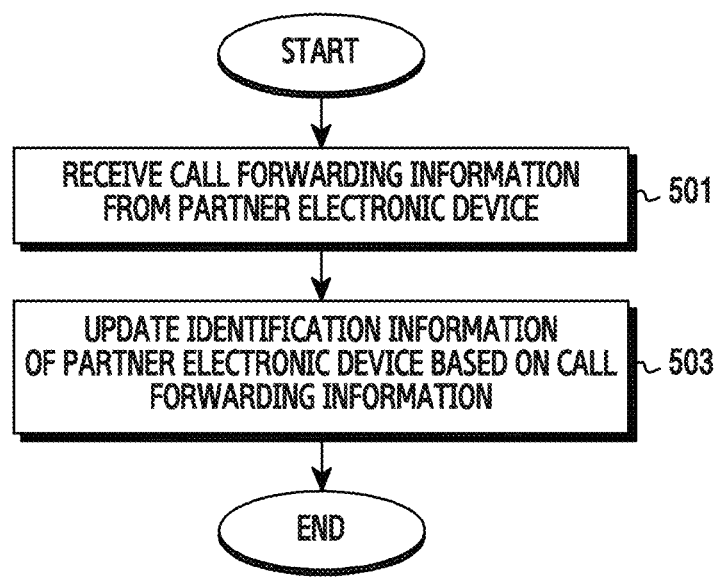
FIG. 5 is a flowchart illustrating a process of updating identification information of a partner electronic device based on call forwarding information received from the partner electronic device according to various embodiments of the present disclosure.

FIG. 5 is a flowchart illustrating a process of updating identification information of a partner electronic device based on call forwarding information received from the partner electronic device according to various embodiments of the present disclosure.

Referring to FIG. 5, in operation 501, an electronic device may receive call forwarding information from a partner electronic device. According to an embodiment of the present disclosure, the electronic device may receive the call forwarding information from the partner electronic device during a call with the partner electronic device.

Referring to FIG. 7B, the electronic device may receive the call forwarding information from the partner electronic device after the end of the call with the partner electronic device.

In operation 503, the electronic device may update identification information of the partner electronic device based on the call forwarding information received from the partner electronic device. According to an embodiment of the present disclosure, as illustrated in FIGS. 7A and 7B, the electronic device may display the call forwarding information of the section 711 received from the partner electronic device, so that the call forwarding information of the section 711 may be registered or cancelled based on a user's selection.

According to an embodiment of the present disclosure, when the call forwarding information of the section 711 received from the partner electronic device is displayed and then the user's selection does not occur for a reference time, the electronic device may control to register or cancel the call forwarding information of the section 711 based on a predetermined setting.

According to an embodiment of the present disclosure, as illustrated in FIGS. 7A and 7B, the electronic device may store the reply number included in the call forwarding information of the section 711 received from the partner electronic device, in the contact number entries of "Hong Gil-Dong" stored in the phone directory.

According to an embodiment of the present disclosure, as illustrated in FIG. 8, the electronic device may store the reply number of the section 821 included in the call forwarding information of the section 711 received from the partner electronic device, in the contact number entries of the section 801 of "Hong Gil-Dong" stored in the phone directory.

According to an embodiment of the present disclosure, when originating a call to the contact number of "Hong Gil-Dong" stored in advance, the electronic device may set to provide an interface through which an incoming phone number can be switched to the reply number included in the call forwarding information of the section 711 received from the partner electronic device.

According to an embodiment of the present disclosure, when originating a call to the contact number of "Hong Gil-Dong" stored in advance, the electronic device may set an incoming phone number to be automatically switched to the reply number included in the call forwarding information of the section 711 received from the partner electronic device.

According to an embodiment of the present disclosure, the electronic device may set a registration event for the call forwarding information of the section 711 received from the partner electronic device not to be displayed again.

Figure 6:
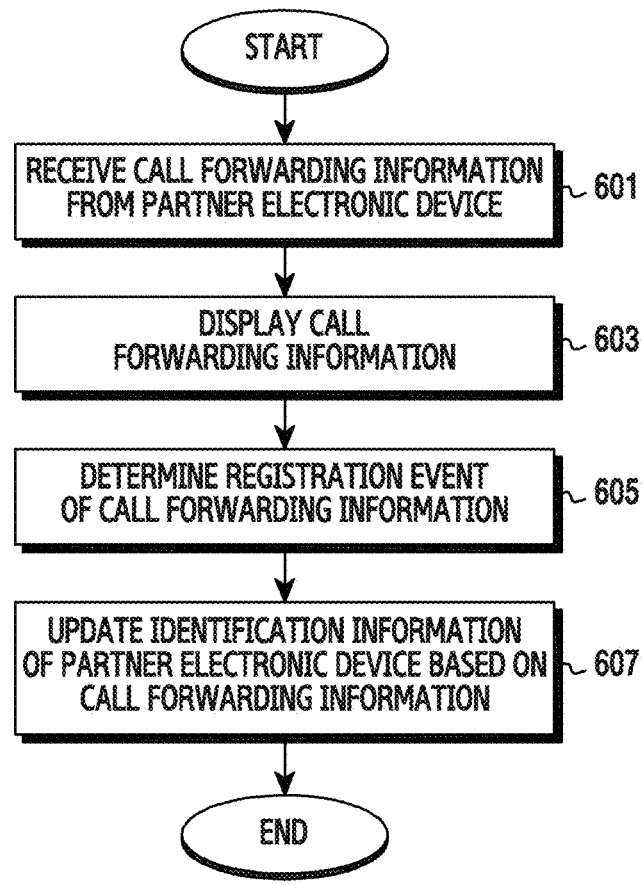
FIG. 6 is a flowchart illustrating a process of updating identification information of a partner electronic device based on call forwarding information received from the partner electronic device according to various embodiments of the present disclosure.

FIG. 6 is a flowchart illustrating a process of updating identification information of a partner electronic device based on call forwarding information received from the partner electronic device in an electronic device according to various embodiments of the present disclosure.

Referring to FIG. 6, in operation 601, an electronic device may receive call forwarding information from a partner electronic device. According to an embodiment of the present disclosure, the electronic device may receive the call forwarding information from the partner electronic device during a call with the partner electronic device.

According to an embodiment of the present disclosure, as illustrated in FIG. 7B, the electronic device may receive the call forwarding information from the partner electronic device after the end of the call with the partner electronic device.

In operation 603, the electronic device may display the call forwarding information received from the partner electronic device. According to an embodiment of the present disclosure, as illustrated in FIG. 7A, the electronic device may display the call forwarding information of the section 711 received from the partner electronic device during a call with the partner electronic device as shown in the section 701.

According to an embodiment of the present disclosure, as illustrated in FIG. 7B, the electronic device may display the call forwarding information of the section 711 received from the partner electronic device after the end of the call with the partner electronic device as shown in the section 721.

In operation 605, the electronic device may determine occurrence of a registration event of the call forwarding information received from the partner electronic device. According to an embodiment of the present disclosure, as illustrated in FIGS. 7A and 7B, the electronic device may display the call forwarding information of the section 711 received from the partner electronic device, so that the call forwarding information of the section 711 may be controlled to be registered or cancelled based on a user's selection.

According to an embodiment of the present disclosure, when the call forwarding information of the section 711 received from the partner electronic device is displayed and then the user's selection does not occur for a reference time, the electronic device may control to register or cancel the call forwarding information of the section 711 based on a predetermined setting.

In operation 607, the electronic device may update identification information of the partner electronic device based on the call forwarding information received from the partner electronic device. According to an embodiment of the present disclosure, as illustrated in FIGS. 7A and 7B, the electronic device may store the reply number included in the call forwarding information of the section 711 received from the partner electronic device, in the contact number entries of "Hong Gil-Dong" stored in the phone directory.

According to an embodiment of the present disclosure, as illustrated in FIG. 8, the electronic device may store the reply number of the section 821 included in the call forwarding information of the section 711 received from the partner electronic device, in the contact number entries of the section 801 of "Hong Gil-Dong" stored in the phone directory.

According to an embodiment of the present disclosure, when originating a call to the contact number of "Hong Gil-Dong" stored in advance, the electronic device may set to provide an interface through which an incoming phone number can be switched to the reply number included in the call forwarding information of the section 711 received from the partner electronic device.

According to an embodiment of the present disclosure, when originating a call to the contact number of "Hong Gil-Dong" stored in advance, the electronic device may set an incoming phone number to be automatically switched to the reply number included in the call forwarding information of the section 711 received from the partner electronic device.

According to an embodiment of the present disclosure, the electronic device may set a registration event for the call forwarding information of the section 711 received from the partner electronic device not to be displayed again.

Figure 9:
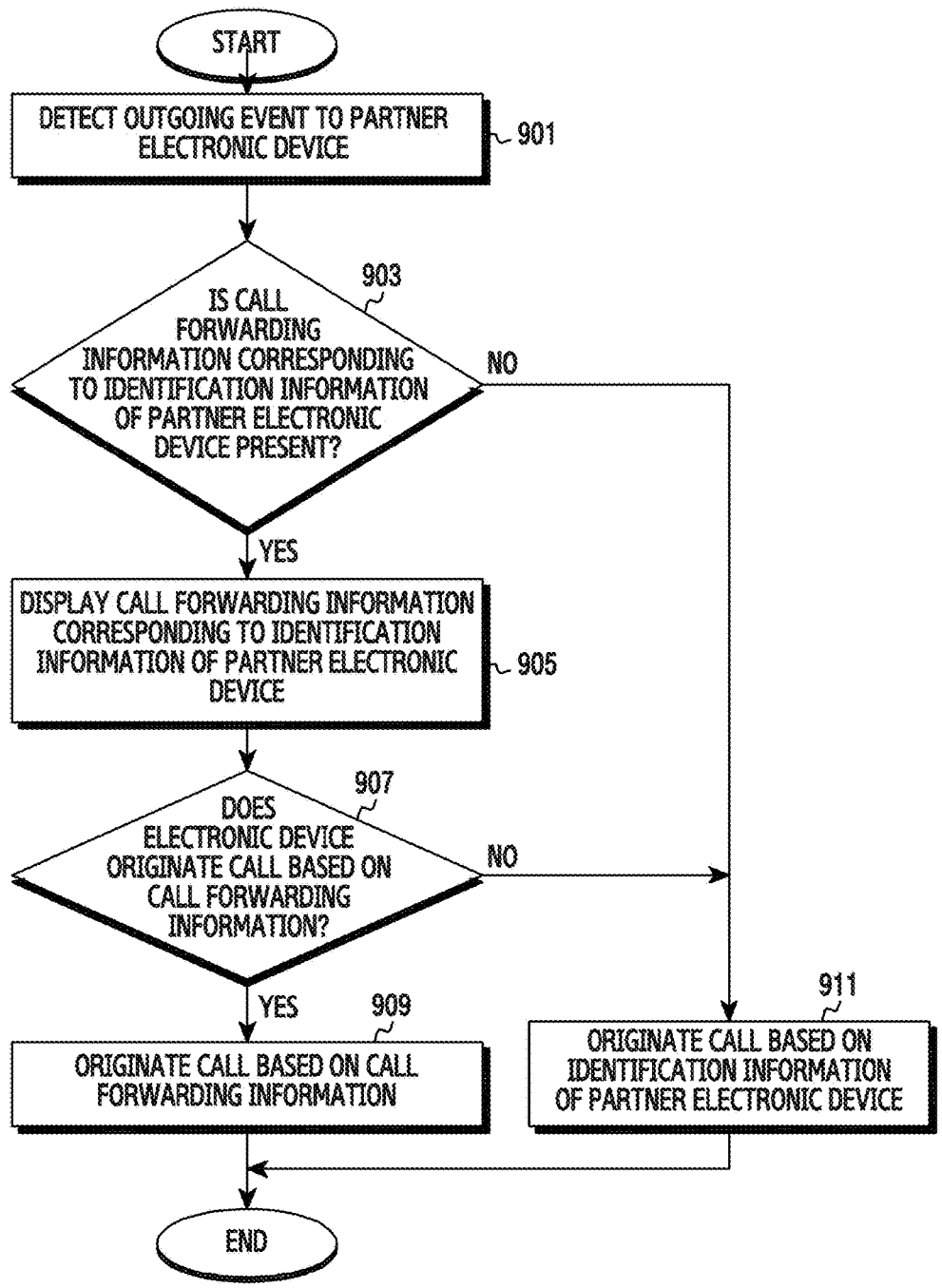
FIG. 9 is a flowchart illustrating a process of performing an outgoing event based on call forwarding information according to various embodiments of the present disclosure.

FIG. 9 is a flowchart illustrating a process of performing an outgoing event based on call forwarding information in an electronic device according to various embodiments of the present disclosure. According to an embodiment of the present disclosure, in operation 901, an electronic device may detect an outgoing event to a partner electronic device. According to an embodiment of the present disclosure, the outgoing event may include at least one of an SMS, an MMS, or a call.

According to an embodiment of the present disclosure, as illustrated in FIG. 10A, the electronic device may determine whether an event of call outgoing 1007 to a first contact number 010-AAA-AAAA of a section 1003 input through a keypad occurs. According to an embodiment of the present disclosure, when a contact number for the first contact number 010-AAA-AAAA of the section 1003 input through the keypad is stored in a memory, the electronic device may display a name of the corresponding contact number as shown in a section 1005.

In operation 903, the electronic device may determine whether call forwarding information corresponding to identification information of the partner electronic device is present. According to an embodiment of the present disclosure, the electronic device may determine whether call forwarding information about the first contact number 010-AAA-AAAA of the section 1003 input through the keypad is stored in the memory.

In operation 905, when the call forwarding information corresponding to the identification information of the partner electronic device is present, the electronic device may display the call forwarding information corresponding to the identification information of the partner electronic device. According to an embodiment of the present disclosure, as illustrated in FIG. 10B, when the call forwarding information about the first contact number 010-AAA-AAAA input through the keypad is present, the electronic device may provide a second contact number 010-BBB-BBBB of a section 1013 based on the call forwarding information as shown in a section 1011.

In operation 907, the electronic device may determine whether to originate a call based on the call forwarding information. According to an embodiment of the present disclosure, as illustrated in FIG. 10B, the electronic device may determine whether to connect to a recommended number by providing the second contact number 010-BBB-BBBB of the section 1013 based on the call forwarding information.

In operation 909, the electronic device may originate a call based on the call forwarding information. According to an embodiment of the present disclosure, when originating a call based on the call forwarding information, the electronic device may attempt a call connection to the second contact number 010-BBB-BBBB based on the call forwarding information, as shown in FIG. 12.

In operation 911, when the call forwarding information corresponding to the identification information of the partner electronic device is absent or when a call is not originated based on the call forwarding information, the electronic device may originate a call based on the identification information of the partner electronic device. According to an embodiment of the present disclosure, as illustrated in FIG. 10A, the electronic device may attempt a call connection to the first contact number 010-AAA-AAAA of the section 1003 input through the keypad.

Figure 11:
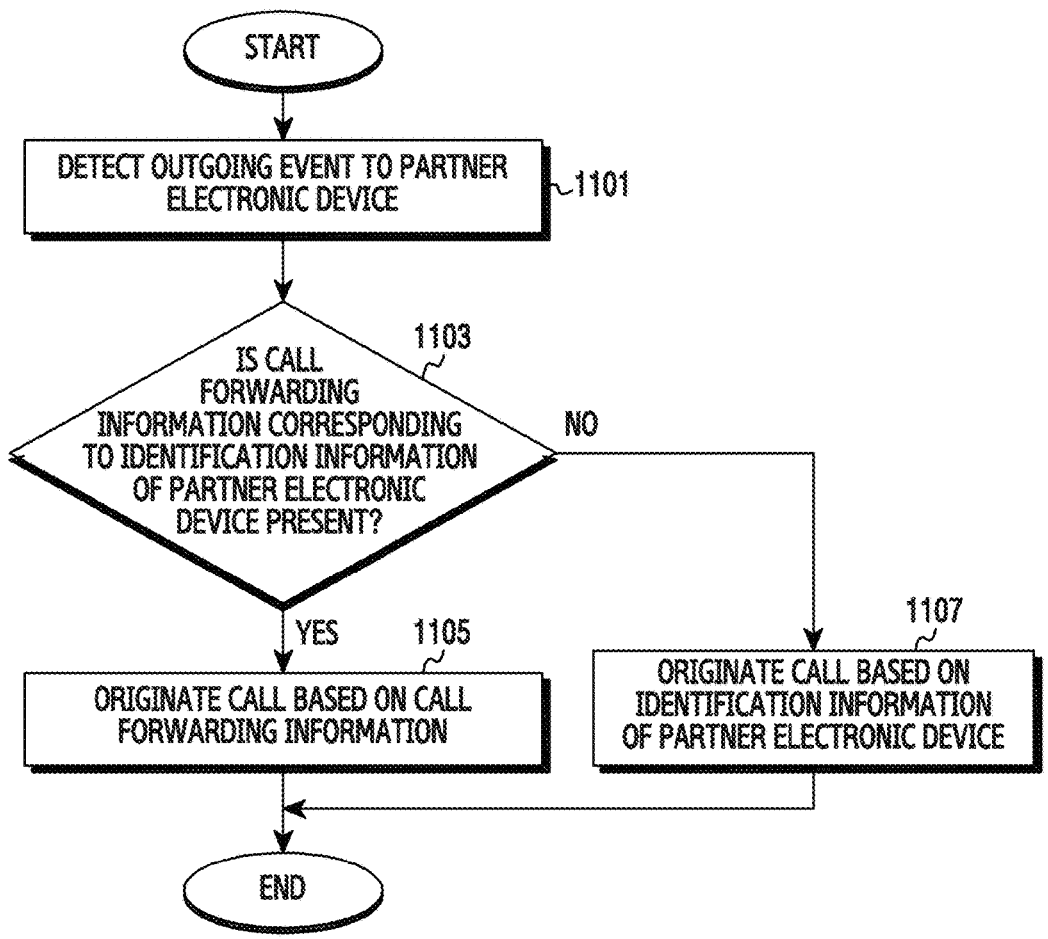
FIG. 11 is a flowchart illustrating a process of performing an outgoing event based on call forwarding information according to various embodiments of the present disclosure.

FIG. 11 is a flowchart illustrating a process of performing an outgoing event based on call forwarding information in an electronic device according to various embodiments of the present disclosure.

Referring to FIG. 11, in operation 1101, an electronic device may detect an outgoing event to a partner electronic device. According to an embodiment of the present disclosure, the outgoing event may include at least one of an SMS, an MMS, or a call.

According to an embodiment of the present disclosure, as illustrated in FIG. 10A, the electronic device may determine whether the event of call outgoing 1007 to the first contact number 010-AAA-AAAA of the section 1003 input through the keypad occurs. According to an embodiment of the present disclosure, when the first contact number 010-AAA-AAAA of the section 1003 input through the keypad is stored in a memory, the electronic device may display a name of the corresponding the first contact number as shown in the section 1005.

In operation 1103, the electronic device may determine whether call forwarding information corresponding to identification information of the partner electronic device is present. According to an embodiment of the present disclosure, the electronic device may determine whether call forwarding information about the first contact number 010-AAA-AAAA of the section 1003 input through the keypad is stored in the memory.

In operation 1105, when the call forwarding information corresponding to the identification information of the partner electronic device is present, the electronic device may originate a call based on the call forwarding information. According to an embodiment of the present disclosure, as illustrated in FIG. 12, the electronic device may attempt a call connection to the second contact number 010-BBB-BBBB based on the call forwarding information.

In operation 1107, when the call forwarding information corresponding to the identification information of the partner electronic device is absent, the electronic device may originate a call based on the identification information of the partner electronic device. According to an embodiment of the present disclosure, as illustrated in FIG. 10A, the electronic device may attempt a call connection to the first contact number 010-AAA-AAAA of the section 1003 input through the keypad.

According to various embodiments of the present disclosure, a method for controlling call forwarding information in an electronic device may include generating call forwarding information, detecting an outgoing event to a partner electronic device, and transmitting the call forwarding information to the partner electronic device.

According to various embodiments of the present disclosure, the call forwarding information may include identification information associated with the electronic device and name information (e.g., business card information) associated with a user of the electronic device.

According to various embodiments of the present disclosure, the identification information may include at least one of a phone number, an e-mail, an image, a video, or texts of the electronic device, and the name information may include at least one of a name, an address, a phone number, an e-mail, a website, a picture, a logo, sound, texts, an image, a video, or multimedia associated with a user of the electronic device.

According to various embodiments of the present disclosure, the transmitting of the call forwarding information may include transmitting the call forwarding information during a call with the partner electronic device or after the end of the call.

According to various embodiments of the present disclosure, the method for controlling the call forwarding information may further include receiving the call forwarding information from the partner electronic device, and updating identification information of the partner electronic device based on the received call forwarding information.

According to various embodiments of the present disclosure, the receiving of the call forwarding information may include receiving the call forwarding information during a call with the partner electronic device or after the end of the call.

According to various embodiments of the present disclosure, the receiving of the call forwarding information may further include displaying the received call forwarding information.

According to various embodiments of the present disclosure, a method for controlling call forwarding information in an electronic device may include detecting an outgoing event to a partner electronic device, detecting whether call forwarding information corresponding to identification information of the partner electronic device is present, and performing the outgoing event to the partner electronic device based on the call forwarding information corresponding to the identification information of the partner electronic device.

According to various embodiments of the present disclosure, when the call forwarding information corresponding to the identification information of the partner electronic device is present, the method for controlling the call forwarding information may further include displaying the call forwarding information corresponding to the identification information of the partner electronic device.

According to various embodiments of the present disclosure, after the displaying of the call forwarding information corresponding to the identification information of the partner electronic device, the method for controlling the call forwarding information may further include determining whether to originate a call based on the call forwarding information.

Figure 13:
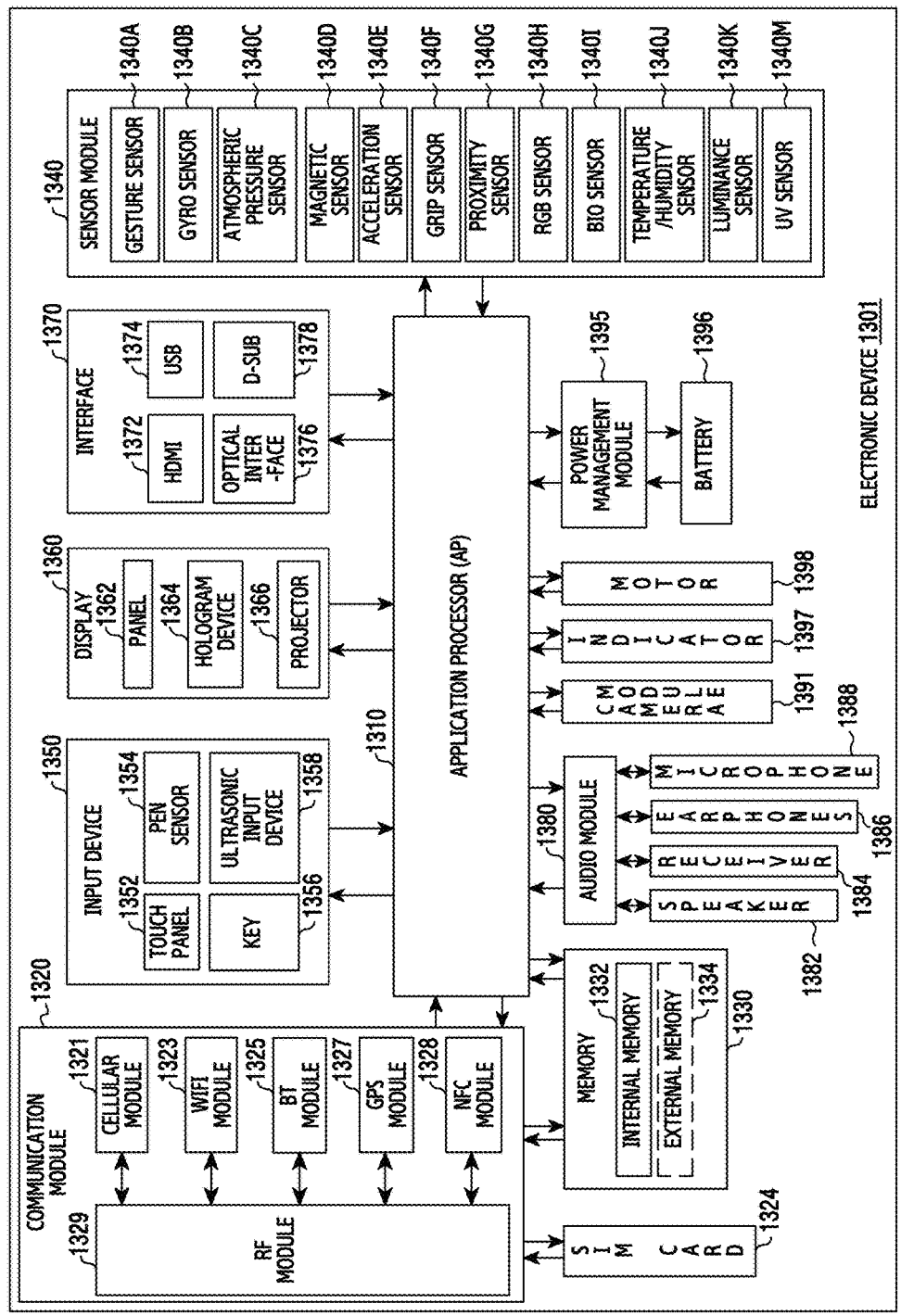
FIG. 13 is a block diagram illustrating an electronic device according to various embodiments of the present disclosure.

FIG. 13 is a block diagram illustrating an electronic device 1301 according to various embodiments of the present disclosure.

According to an embodiment of the present disclosure, the electronic device 1301 may constitute the whole or a part of, for example, the electronic device 101 shown in FIG. 1.

Referring to FIG. 13, the electronic device 1301 may include one or more application processors (APs) 1310, a communication module 1320, a subscriber identification module (SIM) card 1324, a memory 1330, a sensor module 1340, an input device 1350, a display 1360, an interface 1370, an audio module 1380, a camera module 1391, a power management module 1395, a battery 1396, an indicator 1397, and a motor 1398.

The AP 1310 may execute an operating system (OS) or application program to control a plurality of hardware or software components connected to the AP 1310, and perform a variety of data processing including multimedia data and data calculations. The AP 1310 may be implemented using, for example, system on chip (SoC). According to an embodiment of the present disclosure, the AP 1310 may further include a graphic processing unit (GPU) (not shown).

The communication module 1320 (e.g., the communication interface 160 of FIG. 1) may perform data transmission and reception in communication between other electronic devices (e.g., the electronic device 104 of FIG. 1 or the server 106) connected to the electronic device 1301 (e.g., the electronic device 101 of FIG. 1) through a network. According to an embodiment of the present disclosure, the communication module 1320 may include a cellular module 1321, a Wi-Fi module 1323, a BT module 1325, a GPS module 1327, an NFC module 1328, and a radio frequency (RF) module 1329.

The cellular module 1321 may provide voice calls, video calls, SMS services, the Internet services, and the like through a communication network (e.g., LTE, LTE-A, CDMA, WCDMA, UMTS, WiBro, GSM, or the like). In addition, the cellular module 1321 may perform classification and authentication of the electronic device within the communication network using, for example, a SIM (e.g., the SIM card 1324). According to an embodiment of the present disclosure, the cellular module 1321 may perform at least a part of functions that can be provided by the AP 1310. For example, the cellular module 1321 may perform at least a part of a multimedia control function.

According to an embodiment of the present disclosure, the cellular module 1321 may include a communication processor (CP). In addition, the cellular module 1321 may be implemented by, for example, the SoC. In FIG. 13, components such as the cellular module 1321 (e.g., a CP), the memory 1330, the power management module 1395, and the like are illustrated as being components separated from the AP 1310, but according to an embodiment of the present disclosure, the AP 1310 may be implemented to include at least a part (e.g., the cellular module 1321) of the above-described components.

According to an embodiment of the present disclosure, the AP 1310 or the cellular module 1321 (e.g., a CP) may load instructions or data, received from a non-volatile memory or at least one of other components connected to each of the AP 1310 and the cellular module 1321, onto a volatile memory and process the loaded instructions or data. In addition, the AP 1310 or the cellular module 1321 may store data, received from at least one of the other components or generated from at least one of the other components, in the non-volatile memory.

Each of the Wi-Fi module 1323, the BT module 1325, the GPS module 1327, and the NFC module 1328 may include, for example, a processor for processing data transmitted and received through the corresponding module. In FIG. 13, each of the cellular module 1321, the Wi-Fi module 1323, the BT module 1325, the GPS module 1327, and the NFC module 1328 is illustrated as a separate block, but according to an embodiment of the present disclosure, at least a part (e.g., two or more) of the cellular module 1321, the Wi-Fi module 1323, the BT module 1325, the GPS module 1327, and the NFC module 1328 may be included within a single integrated circuit (IC) or IC package. For example, at least a part (e.g., a CP corresponding to the cellular module 1321 and a Wi-Fi processor corresponding to the Wi-Fi module 1323) of processors corresponding to the cellular module 1321, the Wi-Fi module 1323, the BT module 1325, the GPS module 1327, and the NFC module 1328 may be implemented by a single SoC.

The RF module 1329 may perform transmission and reception of data, for example, transmission and reception of RF signals. Although not shown, the RF module 1329 may include, for example, a transceiver, a power amp module (PAM), a frequency filter, a low noise amplifier (LNA), and the like. In addition, the RF module 1329 may further include a part for transmitting and receiving electromagnetic waves on a free space in a wireless communication, such as a conductor, a conducting wire, or the like. In FIG. 13, the cellular module 1321, the Wi-Fi module 1323, the BT module 1325, the GPS module 1327, and the NFC module 1328 are illustrated to mutually share a single RF module 1329, but according to an embodiment of the present disclosure, at least one of the cellular module 1321, the Wi-Fi module 1323, the BT module 1325, the GPS module 1327, or the NFC module 1328 may perform transmission and reception of RF signals through a separate RF module.

The SIM card 1324 may be a card including a subscriber identification module, and may be inserted into a slot that is formed at a specific position of the electronic device. The SIM card 1324 may include unique identification information (e.g., IC card identifier (ICCID)) or subscriber information (e.g., international mobile subscriber identity (IMSI)).

The memory 1330 (e.g., the memory 130) may include an internal memory 1332 or an external memory 1334. The internal memory 1332 may include at least one of, for example, a volatile memory (e.g., dynamic random access memory (DRAM), static RAM (SRAM), synchronous DRAM (SDRAM), or the like) and a non-volatile memory (e.g., one time programmable read only memory (OTPROM), PROM, erasable and programmable ROM (EPROM), electrically erasable and programmable ROM (EEPROM), mask ROM, flash ROM, NAND flash memory, NOR flash memory, or the like).

According to an embodiment of the present disclosure, the internal memory 1332 may be a solid state drive (SSD). The external memory 1334 may further include a flash drive, for example, a compact flash (CF), secure digital (SD), micro-SD, mini-SD, extreme digital (xD), or a memory stick. The external memory 1334 may be functionally connected to the electronic device 1301 through various interfaces. According to an embodiment of the present disclosure, the electronic device 1301 may further include a storage device (or a storage medium) such as a hard drive.

The sensor module 1340 may measure a physical amount or sense the operation state of an electronic device, and convert the measured or sensed information into electrical signals. The sensor module 1340 may include at least one of, for example, a gesture sensor 1340A, a gyro sensor 1340B, an atmospheric pressure sensor 1340C, a magnetic sensor 1340D, an acceleration sensor 1340E, a grip sensor 1340F, a proximity sensor 1340G, a color sensor 1340H (Red, Green, Blue (RGB) sensor), a bio sensor 1340I, a temperature/humidity sensor 1340J, a luminance sensor 1340K, and an ultraviolet (UV) sensor 1340M. Additionally or alternatively, the sensor module 1340 may further include, for example, an E-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris scan sensor (not shown), or a fingerprint sensor (not shown). The sensor module 1340 may further include a control circuit for controlling one or more sensors therein.

The input device 1350 may include a touch panel 1352, a (digital) pen sensor 1354, a key 1356, or an ultrasonic input device 1358. The touch panel 1352 may recognize a touch input using at least one of, for example, a capacitive method, a resistive method, an infrared method, or an ultrasonic method. In addition, the touch panel 1352 may include a control circuit. In the case of a capacitive method, the touch panel 1352 may perform a physical touch or proximity recognition. The touch panel 1352 may further include a tactile layer. In this case, the touch panel 1352 may provide a user with a tactile response.

The (digital) pen sensor 1354 may be implemented, for example, using a method of receiving a user's touch input or the same method or a similar method or using a separate sheet for recognition. The key 1356 may include, for example, a physical button, an optical key, or a keypad. The ultrasonic input device 1358 is capable of confirming data by sensing sound waves from the electronic device 1301 to a microphone (e.g., a microphone 1388) through an input tool that generates an ultrasonic signal and capable of wireless recognition. According to an embodiment of the present disclosure, the electronic device 1301 may receive a user's input from an external device (e.g., a computer or a server) connected to the electronic device 1301 using the communication module 1320.

The display 1360 (e.g., the display 150) may include a panel 1362, a hologram device 1364, or a projector 1366. The panel 1362 may be, for example, a liquid crystal display (LCD) or active-matrix organic light-emitting diodes (AMOLED). The panel 1362 may be implemented to be flexible, transparent, or wearable. The panel 1362, together with the touch panel 1352, may be formed into one module. The hologram device 1364 may display a stereoscopic image into the air using the interference of light. The projector 1366 may project light to a screen to display an image. The screen may be positioned, for example, inside or outside the electronic device 1301. According to an embodiment of the present disclosure, the display 1360 may further include a control circuit for controlling the panel 1362, the hologram device 1364, or the projector 1366.

The interface 1370 may include, for example, an HDMI 1372, a USB 1374, an optical interface 1376, or a d-sub-miniature (D-sub) 1378. The interface 1370 may be, for example, included in the communication interface 160 shown in FIG. 1. Additionally or alternatively, the interface 1370 may include, for example, a Mobile High-definition Link (MHL) interface, an SD/multi-media card (MMC) interface, or an infrared data association (IrDA) standard interface.

The audio module 1380 may convert sound into an electrical signal, and vice versa. At least a partial component of the audio module 1380 may be, for example, included in the input/output interface 140 shown in FIG. 1. For example, the audio module 1380 may process sound information that is inputted or outputted through a speaker 1382, a receiver 1384, an earphone 1386, or a microphone 1388.

The camera module 1391 is a device capable of photographing still images and moving images. According to an embodiment of the present disclosure, the camera module 1391 may include one or more image sensors (e.g., a front sensor or a rear sensor), a lens (not shown), an image signal processor (ISP) (not shown), or a flash (not shown) (e.g., LED or xenon lamp).

The power management module 1395 may manage the power of the electronic device 1301. Although not shown, the power management module 1395 may include, for example, a power management IC (PMIC), a charger IC, or a battery or a fuel gauge.

The PMIC may be mounted on, for example, an IC or an SoC semiconductor. A charging method may be divided into a wired method and a wireless method. A charger IC may charge a battery and prevent the introduction of an overvoltage or an overcurrent from a charger. According to an embodiment of the present disclosure, the charger IC may include a charger IC for at least one of a wired charging method or a wireless charging method. The wireless charging method may include, for example, a magnetic resonance method, a magnetic induction method, or an electromagnetic wave method. Additional circuits for wireless charging, for example, a coil loop, a resonant circuit, a rectifier, and the like may be added.

The battery gauge may measure, for example, the remaining amount of the battery 1396 and voltage, current, or temperature during charging. The battery 1396 may store or generate electricity and supply power to the electronic device 1301 using the stored or generated electricity. The battery 1396 may include, for example, a rechargeable battery or a solar battery.

The indicator 1397 may display a specific state, for example, a booting state, a message state, or a charging state of the electronic device 1301 or a part (e.g., the AP 1310) of the electronic device 1301. The motor 1398 may convert an electrical signal into mechanical vibration. Although not shown, the electronic device 1301 may include a processing device (e.g., GPU) for mobile TV support. The processing device for mobile TV support may process, for example, media data according to standards such as digital multimedia broadcasting (DMB), digital video broadcasting (DVB), or a media flow.

The above described components of the electronic device according to various embodiments of the present disclosure may be formed of one or more components, and a name of a corresponding component element may be changed based on the type of electronic device. In various embodiments of the present disclosure, the electronic device may include at least one of the above-described elements. Some of the above-described elements may be omitted from the electronic device, or the electronic device may further include additional elements. Further, some of the components of the electronic device according to the various embodiments of the present disclosure may be combined to form a single entity, and thus, may equivalently execute functions of the corresponding elements prior to the combination.

According to various embodiments of the present disclosure, the electronic device may provide call forwarding information to the partner electronic device, thereby providing identification information for receiving a reply from the partner electronic device.

The term "module" used in various embodiments of the present disclosure may refer to, for example, a "unit" including one of hardware, software, and firmware, or a combination of two or more of the hardware, software, and firmware. The term "module" may be interchangeably used with a term, such as unit, logic, logical block, component, or circuit. The "module" may be the smallest unit of an integrated component or a part thereof. The "module" may be the smallest unit that performs one or more functions or a part thereof. The "module" may be mechanically or electronically implemented. For example, the "module" according to various embodiments of the present disclosure may include at least one of an application-specific IC (ASIC) chip, a field-programmable gate arrays (FPGAs), or a programmable-logic device for performing operations which have been known or are to be developed hereafter.

According to various embodiments of the present disclosure, at least a part of a device (for example, modules or functions thereof) or a method (for example, operations) according to the various embodiments of the present disclosure may be embodied by, for example, a command stored in a non-transitory computer-readable storage medium in a form of a programming module. When an instruction is implemented by one or more processors (for example, the processor 122), one or more processors may execute a function corresponding to the instruction. The non-transitory computer-readable storage medium may be, for example, the memory 130. At least a part of the programming module may, for example, be implemented (e.g., executed) by a processor. At least a part of the programming module may, for example, include a module, a program, a routine, a set of instructions, or a process for performing at least one function.

The non-transitory computer-readable recording medium may include magnetic media such as a hard disk, a floppy disk, and a magnetic tape, optical media such as a Compact Disc ROM (CD-ROM) and a DVD, magneto-optical media such as a floptical disk, and hardware devices specially configured to store and perform a program instruction (for example, programming module), such as a ROM, a RAM, a flash memory and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

According to various embodiments of the present disclosure, a non-transitory computer-readable recording medium for storing instructions may be a computer-readable recording medium in which a program for executing an operation of generating call forwarding information, an operation of detecting an outgoing event to a partner electronic device, and an operation of transmitting the call forwarding information to the partner electronic device is recorded.

The methods according to the various embodiments of the present disclosure described in the claims and/or the specification may be implemented in the form of hardware, software, or a combination of hardware and software.

In the implementation of software, a non-transitory computer-readable storage medium for storing one or more programs (software modules) may be provided. The one or more programs stored in the non-transitory computer-readable storage medium may be configured for execution by one or more processors within the electronic device. The at least one program may include instructions that cause the electronic device to perform the methods according to various embodiments of the present disclosure as defined by the appended claims and/or disclosed herein.

The programs (software modules or software) may be stored in a RAM, a non-volatile memory including a flash memory, a ROM, an electrically erasable programmable ROM (EEPROM), a magnetic disc storage device, a CD-ROM, a DVD or other types of optical storage devices, or a magnetic cassette. Alternatively, any combination of some or all of the may form a memory in which the program is stored. Further, a plurality of such memories may be included in the electronic device.

In addition, the program may be stored in an attachable storage device capable of accessing the electronic device through a communication network such as the Internet, an intranet, a local area network (LAN), a wide LAN (WLAN), a storage area network (SAN), or any combination thereof. The storage devices may be connected to an electronic device through an external port.

Further, a separate storage device on the communication network may access a portable electronic device.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of an electronic device, the method comprising:
   receiving, by the electronic device, information regarding a second electronic device wirelessly interlockable with a first electronic device from the first electronic device, during a call with the first electronic device or after the end of the call;
   storing, by the electronic device, the received information;
   in response to detecting an outgoing event for transmitting a call or a message to the first electronic device, displaying, by the electronic device, a notification indicating to performing the outgoing event to the second electronic device; and
   transmitting, by the electronic device, at least one of the call or the message to the second electronic device based on the stored information.

2. The method of claim 1, wherein the transmitting of the at least one of the call or the message to the second electronic device based on the stored information comprises determining, by the electronic device, whether to transmit at least one of the call or the message to the second electronic device based on an input on the notification.

3. The method of claim 1, wherein the information comprises at least one of a phone number, an e-mail, an image, a video, or texts associated with the second electronic device.

4. The method of claim 1, wherein the notification is displayed as at least one of a pop-up window or an input window.

5. The method of claim 1, wherein the received information is stored in a contact of the first electronic device stored in the electronic device.

6. The method of claim 1, wherein the storing of the received information comprises:
   displaying a notification indicating the information regarding the second electronic device wirelessly interlockable with the first electronic device is received, and determining whether an input for storing the received information is detected.

7. A method of an electronic device, the method comprising:
   detecting, by the electronic device, an outgoing event for transmitting a call or a message to a counterpart electronic device; and
   transmitting, by the electronic device, information regarding another electronic device wirelessly interlockable with the electronic device, to the counterpart electronic device so that the call or the message to be transmitted to the electronic device is received by the another electronic device,
   wherein the information regarding another electronic device is transmitted during a call with the counterpart electronic device or after the end of the call.

8. The method of claim 7, wherein the information comprises at least one of a phone number, an e-mail, an image, a video, or texts associated with the another electronic device.

9. The method of claim 7, further comprising determining the information based on data received via an input window displayed in the electronic device.

10. The method of claim 7, further comprising receiving, by the electronic device, data related to the another electronic device, from the another electronic device, wherein the information generated based on the received data.

11. An electronic device comprising:
    a memory storing instructions;
    a communication circuit;
    a display unit; and
    at least one processor, electrically coupled to the communication circuit and the memory, configured to execute the stored instructions to:
    receive information regarding a second electronic device wirelessly interlockable with a first electronic device from the first electronic device, during a call with the first electronic device or after the end of the call,
    store the received information,
    in response to detecting an outgoing event for transmitting a call or a message to the first electronic device, display a notification indicating to performing the outgoing event to the second electronic device, and
    transmit at least one of the call or the message to the second electronic device based on the stored information.

12. The electronic device of claim 11, wherein the at least one processor is further configured to execute the stored instructions to determine whether to transmit at least one of the call or the message to the second electronic device based on an input on the notification.

13. The electronic device of claim 11, wherein the call forwarding information comprises at least one of a phone number, an e-mail, an image, a video, or texts associated with the second electronic device.

14. The electronic device of claim 11, wherein the notification is displayed as at least one of a pop-up window or an input window.

15. The electronic device of claim 11, wherein the at least one processor is further configured to execute the stored instructions to store the information in a contact of the first electronic device stored in the electronic device.

16. The electronic device of claim 11, wherein the at least one processor is further configured to execute the stored instructions to:
    display a notification indicating the information regarding the second electronic device wirelessly interlockable with the first electronic device is received; and determine whether an input for storing the received information is detected.

\* \* \* \* \*